(12) United States Patent
Sanae et al.

(10) Patent No.: US 6,632,388 B1
(45) Date of Patent: Oct. 14, 2003

(54) MANUFACTURING METHOD OF SKIN FOR AIR BAG DOOR

(75) Inventors: Shoji Sanae, Komaki (JP); Shigehiro Ueno, Kasugai (JP); Akiyoshi Nagano, Tatsuta-mura (JP); Hiroshi Suyama, Gifu (JP); Akio Nakano, Nagoya (JP)

(73) Assignees: Tokai Chemical Industries, Ltd., Komaki (JP); Toyoda Gosei Co., Ltd., Nishikasugai-gun (JP)

( * ) Notice: Subject to any disclaimer, the term of this patent is extended or adjusted under 35 U.S.C. 154(b) by 100 days.

(21) Appl. No.: 09/585,276

(22) Filed: Jun. 2, 2000

(30) Foreign Application Priority Data

Jun. 3, 1999 (JP) ............................................. 11-156390
Mar. 28, 2000 (JP) ....................................... 2000-088157

(51) Int. Cl.[7] .............................................. B29D 31/00
(52) U.S. Cl. ........................ 264/138; 264/152; 264/294
(58) Field of Search ................................ 264/138, 152, 264/263, 271.1, 275, 294, 277

(56) References Cited

U.S. PATENT DOCUMENTS

| 4,459,256 | A | * | 7/1984 | Ziegler |
| 4,893,833 | A | * | 1/1990 | DiSalvo et al. |
| 4,952,351 | A | * | 8/1990 | Parker et al. |
| 5,478,107 | A | * | 12/1995 | Yamagishi et al. |
| 6,062,590 | A | * | 5/2000 | Gallagher |

FOREIGN PATENT DOCUMENTS

| DE | 198 31 462 A1 | 1/2000 |
| JP | 1-202550 | 8/1989 |
| JP | 5-294196 | 11/1993 |
| JP | 6-285876 | 10/1994 |
| JP | 7-156737 | 6/1995 |
| JP | 11-222089 | 8/1999 |

* cited by examiner

*Primary Examiner*—Jan H. Silbaugh
*Assistant Examiner*—Geoffrey P. Shipsides
(74) *Attorney, Agent, or Firm*—Oblon, Spivak, McClelland, Maier & Neustadt, P.C.

(57) ABSTRACT

An air bag door construction in which the air bag develops smoothly and securely, the skin can be easily produced. The skin is formed by a mold including an endless and annular wall provided on a molding surface to be inclined relative to the molding surface. A groove portion of the skin formed by the wall is cut at a bottom portion to separate the skin into a general portion and a door portion which are made flush with each other. When the surfaces of the general portion and the door portion are flush the gap between the general portion and the door portion can be narrowed, and gap on the surface is narrowed. When the skin is disposed in the mold for foam forming, the skin can position the general portion and the door portion in the desired position easily, and will not scatter a skin chip in the development of the air bag.

10 Claims, 3 Drawing Sheets

MANUFACTURING METHOD OF SKIN FOR AIR BAG DOOR

BACKGROUND OF THE INVENTION

1. Field of the Invention

This invention relates to a skin used to form a surface such as a vehicle interior panel and manufacturing method thereof, and to a manufacturing method of skin for air bag door and an air bag door.

2. Related Art

For protecting a passenger in an automobile from a traffic accident with increase of the traffic, an air bag has been installed in the recent automobile. For example, an air bag for a driver contained in a steering wheel is expanded by gas generated due to shock applied in collision of the automobile and developed into a vehicle room. Thus, the air bag protects the driver seated on a driver's seat from collision against the steering wheel and a front glass. The air bag may also be contained in a rear surface side of an instrument panel to protect a passenger seated on an assistant seat from a collision against the instrument panel and the front glass. Further, in recent years, installing the air bag in a rear surface side of a door trim to protect the passenger from collision applied from side (door) has been recommended.

The vehicle interior panel such as the instrument panel and the door trim are constructed by a base member made of a hard resin, a foamed body layer made of a polyurethane foam etc. and laminated on a surface of the base member, and a skin made of a polyvinylchloride etc. and laminated on a surface of the foamed body layer. The interior panel holds shape thereof by rigidity of the base member, increases smooth feeling by the foamed body layer, and increases surface appearance and further increases the smooth feeling by the skin.

When the air bag is disposed in the rear surface side of such interior panel, the interior panel having rigidity is hardly broken to hinder the expansion and development of the air bag. In view of this, the interior panel is provided with an opening usually closed or covered by an air bag door and allows the air bag to develop. When the air bag expands by large shock applied to the automobile by collision etc., the air bag door is pushed and opened by the air bag for allowing the air bag to develops into the vehicle room smoothly.

Conventionally, the air bag door is formed separately or independent from the interior panel, and is fixed to the interior panel by engagement and so on. According to such separate air bag door construction, the interior panel does not hinder development of the air bag into the vehicle room. However, in this case, a boundary line (outer periphery) of the air bag door may appear on the surface of the interior panel as a relatively wide and deep groove, or a step or height difference may be formed between the interior panel surface and the air bag door surface, whereby the surface appearance of the interior panel is deteriorated in both cases.

On the other hand, if the air bag door is formed integral with the interior panel, the boundary line of the air bag door does not appear or expose on the surface of the interior panel to improve the surface appearance thereof. However, such integral structure may hinder development of the air bag into the vehicle room, so that connecting strength of the air bag door with the interior panel needs to be selected as small as possible for an instantaneous development of the air bag when the shock is applied.

As such interior panels having small connecting strength of the air bag door, Japanese Patent Publication No. 1-202550 for example discloses a cover body for an air bag comprising a core layer made of a hard resin and provided with a slit of H-shape or cross-shape, and a soft skin layer formed on a surface of the core layer integral therewith.

Also, Japanese Patent Publication No. 5-294196 discloses an air bag containing cover body comprised of a hard core layer provided with a slit at a rear surface side thereof, and a soft skin layer.

In these interior panels disclosed in the above Publications, in the usual state when the shock is not applied, rigidity of the interior panel is secured by the core layer, and the smooth feeling is obtained by the skin layer. When the shock is applied, the cover body is torn along the slit on the core layer forming a fragile portion by the expanding force of the air bag and allows the air bag to develop into the vehicle room.

However, even when the fragile portion is provided on the core layer so that part of the core layer defined by the fragile portion forms the door, there is case where an extensive rigidity of the skin layer hinders development of the air bag. In view of this, Japanese Patent Publication No. 7-156737 discloses an air bag structure in which a skin of an air bag door and a skin of an interior panel are separately formed, and a convex portion and a concave portion provided on annular bent flanges of the both skins are engaged with each other to form an integrated skin. This integrated skin is disposed in a mold, followed by an integral forming of a foamed body layer to the skin. This air bag structure hardly generates a step or a gap at the boundary portion of the air bag door, and will not cause problem due to the extension rigidity of the skin. Japanese Patent Publication No. 11-222089 discloses a skin for an instrument panel comprised of a general portion and an air bag door portion formed at a part of the general portion and defined by an annular groove portion. In this skin, the air bag door portion and the general portion are formed so that a step portion is formed between the surface of the former and the surface of the latter, and opposing peripheries of the air bag door portion and the general portion are coincided in a direction parallel to the surface of the skin.

The groove portion of the skin for the instrument panel is deformed by relative shift of the air bag door portion and the general portion in the direction orthogonal to the skin surface to remove the step portion, then is set in the foam mold together with the resin base member. Then, the foamed body layer is formed by the foam forming to connect it with the base member and the skin integrally. Thus, the instrument panel having the air bag door can be produced.

According to the skin for the instrument panel of Japanese Patent Publication No. 11-222089, the surface appearance of the skin can be improved due to the narrowed width of the groove portion. Also, the man-hour for forming the skin for the instrument panel can be reduced since the skin having the air bag door portion can be formed by single forming process. Further, durability of the mold for the skin increases since thickness of the convex portion on the mold for forming the groove portion needs not be thinned extremely.

However, the above Japanese Patent Publication No. 7-156737 and Japanese Patent Publication No. 11-222089 have following disadvantages. That is, in the interior panel construction shown in the above JP '737, the skin of the air bag door and the skin of the interior panel needs to be separately formed, which requires the separate, two kinds of molds, and increases the manufacturing cost of the skin. Also, the connecting working between the skin of the air bag door with the skin of the interior panel increases the required man-hour. Further, to prevent formation of the step portion and the gap which may be formed at the boundary portion of the air bag door when the air bag door and the interior panel are connected, the convex portion and the concave portion formed at the annular flanges of the skins should have high positional accuracy. To set the tearing condition of the skin in the expansion of the air bag constant, the convex portion and the concave portion of the annular flanges should have high shape accuracy. These accuracy requirements also increase the man-hour.

Also, in the skin for the instrument panel disclosed in the above JP '089, the groove portion has the depth direction extending orthogonal to the skin surface. For this reason, if the groove portion is opened in the endurance test or after long-term use, the deeper part of the groove appears remarkably. Further, the instrument panel is formed in the condition where the groove portion is deformed, the stress generated by deformation of the groove portion remains in the skin to cause deformation of the skin.

SUMMARY OF THE INVENTION

The present invention is made by taking above circumstances into consideration, and has the first object or purpose to provide a skin comprising a general portion and a defining portion defined by an annular groove portion and produced integrally by small man-hour. The surface appearance of the skin is improved by narrowing width of the groove portion and by removing the step portion between the general portion and the defined portion, and is not deteriorated by the endurance test and so on.

The second object of the present invention is to provide an air bag door construction skin of which has excellent surface appearance, and in which the air bag develops smoothly and securely.

A skin of the present invention for overcoming the above problem or the subject matter is comprised of a general portion and a defined portion defined by an annular groove portion formed at a part of the general portion, and having a parting line for parting the general portion and the defined portion in the groove portion. Wherein the general portion has an annular first bent portion formed along the groove portion to protrude toward a rear surface to be inclined by a predetermined angle relative to a surface of said general portion; the defined portion has an annular second bent portion formed along the groove portion to protrude toward a rear surface to be inclined by a predetermined angle relative to a surface of the defined portion substantially parallel to the first bent portion; and the surface of the first bent portion and the surface of the second bent portion are closely opposed wherein the surface of the general portion and the surface of the defined portion are flush with each other to form the groove portion therebetween.

A method for manufacturing a skin of the present invention manufactures the skin including a general portion and a defined portion defined by an annular groove formed at a part of the general portion. The manufacturing method for the skin is comprised steps of preparing a mold having an endless and annular wall formed on a part of a molding surface; forming a skin including an annular groove portion of substantially U-shape cross-section being formed by the wall of the mold, the general portion located outside the groove portion, and a defined portion enclosed by the groove portion and having a height difference or a step between a surface of the general portion and a surface of the defined portion; and then removing the height difference between the surface of the general portion and the surface of the defined portion by relatively shifting the general portion and the defined portion after separating the general portion and the defined portion by cutting a bottom portion of the groove portion.

A manufacturing method for a skin for an air bag door of the present invention for overcoming the above problem prepares a mold having an endless and annular wall formed on a part of a molding surface and forms a skin including an annular groove portion of substantially U-shape cross-section by the wall of the mold, a general portion located outside the groove portion, and a door portion enclosed by the groove portion, and having a height difference or a step between a surface of the general portion and a surface of the door portion. Then, the height difference between the surface of the general portion and the surface of the door portion is removed by relatively shifting the general portion and the door portion after separating the general portion and the door portion by cutting a bottom portion of the groove portion.

An air bag door of the present invention for overcoming the above problem includes a resin base member, a skin and an intermediate foamed body layer, the skin including at a part thereof an annular groove portion defining a general portion and a door portion and being provided a parting line where the skin is separated into the general portion and the door portion. Wherein said general portion has an annular end portion having a first bent portion facing with the groove portion, and said door portion has an annular end portion having a second bent portion facing with the groove portion; and the first bent portion and the second bent portion are inwardly inclined by a predetermined angle respectively relative to the surface of the door portion so that diameters of the first bent portion and the second bent portion increase towards the surface of the door portion, and are closely disposed to be buried in the foamed body layer.

BEST MODE FOR CARRYING OUT THE INVENTION

Figure 1:
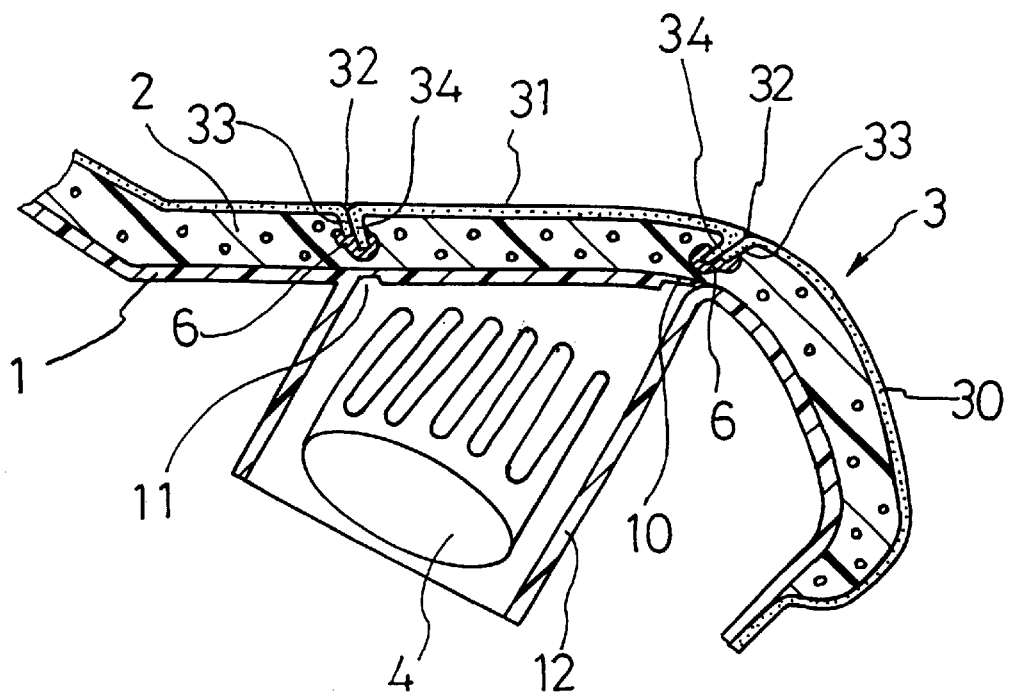
FIG. 1 is a partial cross-sectional view showing an air bag door part of an instrument panel produced by the first embodiment of the present invention.

In the skin of the present invention, the general portion and the defined portion are separately formed and can be parted at the parting line formed in the annular groove portion. The general portion has the annular first bent portion formed along the groove portion to protrude toward the rear surface to be inclined by the predetermined angle relative to the surface of the general portion, and the defined portion has the annular second bent portion formed along the groove portion to protrude toward the rear surface to be inclined by the determined angle relative to the surface of the defined parallel to the first bent portion. The surface of the first bent portion and the surface of the second bent portion are closely opposed to form the groove portion therebetween, in the state where the surface of the general portion and the surface of the defined portion are flush with each other.

That is, in the skin of the present invention, the depth direction of the groove portion is inclined relative to the skin surface. Accordingly, even when the groove portion of the skin is opened in the endurance test etc., only a inclined surface(s) of the first bent portion or the second bent portion appears. As a result, the groove portion is observed to be shallow, and thus surface appearance of the skin is not deteriorated. In addition, since the general portion and the defined portion are disposed in the separate state where the surface of the former and the surface of the latter are flush and the first bent portion of the former and the second bent portion of the latter are closely contacted, stress has not been generated in the skin in the forming of the interior panel. Thus, the skin of the present invention can contribute to produce the interior panel in which no residual stress has been existed and which has an excellent dimensional accuracy.

Here, the inclined directions of the first bent portion and the second bent portion of the skin are not restricted. However, when the skin is used for the instrument panel having the air bag door, the first and second bent portions are preferably designed to be inclined by the acute angles relative to the surface of the defined portion in order to prevent a mutual interference in the development of the air bag.

By the way, in the conventional manufacturing method of the air bag door integrate-type skin, there is a case where the surface of the air bag door and the surface of the interior panel are formed integrally and then the door portion is formed by cutting the integrated skin along the circle. When this manufacturing method is used, in order to conceal the cut end surface of the skin, an annular groove portion is preferably formed at a boundary area between the door portion and the general portion and then it is cut at a bottom portion thereof. However, when the annular groove portion is formed by a powder slush forming etc., the mold needs to be provided with an annular wall on a molding surface thereof. This wall should have thickness larger than the predetermined value to maintain strength of the mold and so on. As a result, width of the groove portion of the skin increases unnecessarily, causing surface appearance deterioration of the skin surface.

In view of the above, in the manufacturing method for a skin of the present invention, a mold having an endless and annular wall formed on a part of a molding surface is prepared; and a skin including an annular groove portion of substantially U-shape cross-section being formed by the wall of the mold, a general portion located outside the groove portion, and a defined portion enclosed by the groove portion, and having a height difference between a surface of the general portion and a surface of the defined portion is formed. Then the height difference between the surface of the general portion and the surface of the defined portion is removed by relatively shifting the general portion and the defined portion after separating the general portion and the defined portion by cutting a bottom portion of the groove portion.

Working-out of the wall shape of the mold can narrow width of the groove portion of the skin even if thickness of the wall is increased, so that not only strength of the mold can be secured but surface appearance of the skin can be improved.

In the manufacturing method of the skin of the present invention, the wall of the mold is preferably inclined by the predetermined angle relative to the molding surface forming one of the general portion and the defined portion of the skin. Cutting the bottom portion of the groove portion formed by such inclined wall can form an annular first bent portion bent toward the rear surface by a predetermined angle at the end portion of the general portion facing with the groove portion, and can form an annular second bent portion bent toward the rear surface by a predetermined angle at the end portion of the defined portion facing with the groove portion. In case where the whole annular wall of the mold is constructed into a truncated cone shape or a truncated square pyramid shape by adjusting the inclined angle of the wall, when the step between the surfaces of the general portion and the defined portion of the skin is removed by relative shift between the general portion and the defined portion, space existed between the first bent portion and the second bent portion can be narrowed. As a result, gap appeared at the boundary area between the general portion and the defined portion can be narrowed, so that width of the groove portion formed between the first and second bent portions can be extremely narrowed to increase surface appearance of the skin.

In addition, the whole wall of the mold can be constructed into a rectangular shape having four sides a pair of wall parts of which opposed to each other are inclined to be parallel. According to such obstruction, shifting the general portion or the defined portion in the same direction as the inclined direction of the wall can remove the step between the surfaces of the general portion and the defined portion. In this case, working out the wall shape can shorten width of the groove portion to almost zero in the surface observation, and width of at least one paired opposing grooves will not be varied by the relative shift between the general portion and the defined portion.

Hereinafter, embodying modes of the skin and the manufacturing method thereof according to the present invention will be explained concretely. As the manufacturing method of the skin, a powder slush method and a vacuum forming can be used. In the following, manufacturing of the skin by the powder slush forming method will be explained. It is noted however when the vacuum forming is used, the mold having the reversed convex/concave on the molding surface to the convex/concave on the molding surface of the powder slush mold can be sufficiently used.

A height difference between the molding surface part for forming the general portion and the molding surface part for forming the defined portion can be determined in view of the inclined angle of the wall. For example, the whole wall has substantially a reversed truncated cone shape in which diameter increases toward the molding surface, the molding surface is formed so that the molding surface part enclosed by the wall becomes deeper than the molding surface part outside the wall. This mold can form the skin including the annular groove portion, the general portion outside the groove portion and the defined portion enclosed by the groove portion, and having the step between the surfaces of the general portion and the defined portion. Then the general portion and the defined portion of the skin are separated by cutting the bottom portion of the groove portion, and are relatively shifted to remove the step between the surfaces of the general portion and the defined portion. Consequently, in the relative shift of the general portion and the defined portion, the first bent portion and the second bent portion are closely contacted to narrow width of the groove portion forming the boundary area between the general portion and the define portion. To the contrary, the whole wall has a substantially truncated cone shape in which diameter decreases toward the molding surface, the molding surface is formed so that the molding surface part outside the wall becomes deeper than the molding surface part enclosed by the wall.

In the above manufacturing method of the skin, the inclined angle of the wall relative to the molding surface is preferably selected larger than 65 degrees. If the inclined angle of the wall is smaller than 65 degrees, for example, angle difference between the abuse angle of the wall at side of the general portion and the acute angle of the wall at side of the defined portion increases. As a result, the difference of radius of the round portion of the skin formed by the corner portions of the mold between the inside and outside of the wall increases, so that surface appearance of the skin is deteriorated.

The surface of the wall of the mold preferably protrudes from a molding surface (molding surface H) forming the skin having a higher surface, protrudes convexly following to the molding surface H, and then inverses to continue to a molding surface (molding surface L) forming the skin having a lower surface.

Such surface shape of the wall can, even if the tip end of the wall has large thickness, shorten distance between the first bent portion formed by the outer periphery surface at the tip end portion of the wall and the second bent portion formed by the inner peripheral surface at the root portion of the wall. Thus, width of the groove portion of the skin can be narrowed with securing strength of the wall of the mold.

Here, the skin manufactured by the above manufacturing method can be used as a skin for various vehicle interior goods such as an air bag, glove box door or console box door.

In case where the above manufacturing method of the skin is applied to the skin for the air bag door, the wall of the mold is preferably inclined inwardly relative to the molding surface part enclosed by the wall by the acute angle, more preferably by 65 to 85 degrees. Such inwardly inclined wall can form the first bent portion and the second bent portion of the skin of which the diameters increases toward the surface side of the door portion, and of which the mutual interference in the development of the air bag is avoided. Thus, scatter of the skin chip due to interference between the first and second bent portions can be prevented.

The skin can be formed by resin materials such as polyvinylchloride, thermoplastic polyurethan or polyolefin.

The bottom portion of the groove portion can be cut by various cutting manners such as a blade, laser beam or water jet stream. When the blade is used to cut the groove portion manually, it is guided by the side wall of the wall to cut the bottom portion smoothly and accurately.

For manufacturing a skin integrated-type air bag door, the skin for the air bag door produced by the above manufacturing method for example is disposed on one of molding surfaces of a foam molds so that the surface of the general portion and the surface of the door portion are flush with each other. Such disposition of the surface skip can narrow gap between the first bent portion and the second bent portion, or can bring the first bent portion and the second bent portion into a closely contacted condition in the surface observation.

On the other hand, on other molding surface of the foam mold, the resin base member having been formed into the predetermined shape by the injection-molding etc. is disposed. In this condition, the foam forming is performed between the skin and the base member. Thus, the skin integrate-type air bag door in which the skin and the base member are joined to the foamed body layer can be produced. This manufacturing method can narrow gap between the first bent portion and the second bent portion of the skin sufficiently, so that not only leakage of the foaming resin through the gap is prevented but the surface appearance deterioration of the air bag door is prevented.

In this manufacturing method of the air bag door, the skin produced by the above manufacturing method of the skin for the air bag door is preferably used. However, the skin in which the general portion and the door portion are separately or independently formed, and which has the first bent portion and the second bent portion inclined by the same angle can be used. Such skin can have the same advantage as above skin.

The tip end of the first bent portion and the second bent portion is preferably covered by a tape etc. to prevent leakage of the foaming resin more securely. As the tape, tapes easily broken or torn in the expansion of the air bag, not scattering chip thereof is preferably used, and an urethan slub tape is most preferable for such tape. The urethan slub tape becomes fragile by impregnation and solidification of a foam urethan resin in the foam-forming to be easily broken. A framework of the urethan foam can reduce scattering amount of the chip.

When the urethan slub tape is used, it preferably has width of about 10.0 mm and preferably has small thickness of about 2.0 mm in view of the adhering work to the first and second bent portions. By taking easiness for breaking of the tape in the expansion of the air bag into consideration, the porous tape having density of 0.01 to 0.2 g/cm$^3$ is desirably used in preference to the fiber series tape. An adhesive tape having adhesion at both surfaces thereof can be used to adhere the urethan slub tape to the tip end of the first and second bent portions, for example. However, when strength of a tape base member of the adhesive tape may affect bad influence to breaking character thereof, an adhesive agent can be used for adhesion of the urethan slub tape.

When the skin is disposed on the molding surface of the foam mold, it is preferably held on the molding surface by an vacuum absorbing and so on. If the skin manufactured by the manufacturing method of the present invention is used, the whole surface of the skin can be made flat and the groove portion formed between the general portion and the defined portion can be narrowed, by merely causing the relative shift between the first bent portion and the second bent portion due to relative sliding therebetween. Accordingly, the skin can be positioned on the molding surface of the foam forming surface easily, and the man-hour necessary for positioning of the skin can be reduced due to even or smooth surface shape (convex/concave are not formed).

As resin materials for the resin base member, hard resins such as polypropylene, polyethylene, nylon, ABS resin, or reinforced resin produced by mixing glass fibers into polypropylene etc. can be selectively used corresponding to the manufacturing cost and the forming method. In addition, the resin base member can be produced by the injection-molding method and so on.

At a part of the resin base member corresponding to the door portion, a fragile portion or an opening is formed. The fragile portion can be easily broken or torn in expansion of the air bag. The fragile portion can be formed by a groove, recessed portion, slit or penetrated hole. The fragile portion can have a square shape, U-shape, H-shape or cross-shape. The fragile portion of the resin base member and the boundary area (groove portion) of the skin between the general portion and the door portion can have same shape to be coincided at the same position, or can have different shape.

In the air bag door of the present invention, the general portion has an annular end portion having a first bent portion facing with the groove portion, and the door portion has an annular end portion having a second bent portion facing with the groove portion. The first bent portion and the second bent portion are inwardly inclined by a predetermined angle respectively relative to the surface of the door portion so that diameters of the first bent portion and the second bent portion increase towards the surface of the door portion, and are closely disposed to be buried in the foamed body layer.

Therefore, extremely narrowed width of the groove portion gives excellent surface appearance of the skin. The first bent portion and the second bent portion are not connected by the mechanical connection such as engagement of the convex portion and the concave portion, so they can be separated easily by the expanding force of the air bag, without hindering development of the air bag and without scattering the skin chip in the tearing.

The inclined angle of the first bent portion and the second bent portion toward the door portion is preferably selected more than 65 degrees. If the inclined angles of the first bent portion and the second bent portion are smaller than 65 degrees, angle difference between the obtuse angle of the second bent portion and the acute angle of the first bent portion increases. As a result, the difference of radius of the round portion of the skin formed by the corner portions of the mold between the first bent portion and the second bent portion increases, so that surface appearance of the skin is deteriorated.

The first bent portion and the second bent portion are preferably inclined relative to the surface of the door portion toward the inner periphery side (radially inwardly) thereof, more preferably by angle of 65 to 85 degrees. Such inclination of the first and second bent portion makes opening of the air bag door in the expansion of the air bag easier for allowing the air bag to develop into the vehicle room. The skin chip due to interference between the adjacent skins will not be generated.

In summary, according to the skin of the present invention, it has the higher dimensional accuracy of the skin and has the excellent surface appearance since deformation of the skin due to stress has not been occurred. If the groove portion of the skin is opened by in the endurance test etc., the surface appearance is not deteriorated. According to the manufacturing method for the skin of the present invention, the skin can be easily formed by single mold to reduce the man-hour and the manufacturing cost. Further, according to the air bag door of the present invention, it has the excellent surface appearance since step between the general portion and the door portion is removed and width of the annular groove portion located at boundary of the general portion and the door portion is extremely narrowed. Also, the air back door construction makes the air bag development easier, and it will not scatter the skin chip in the air bag developing.

PREFERRED EMBODIMENT OF THE INVENTION

Hereinafter, the present invention will be explained concretely based on embodiments in which the present invention has been applied to an instrument panel of an automobile and to a skin thereof.

<Embodiment 1>

FIG. 1 shows a partial cross-sectional view showing an air bag door part for an assistant seat of the instrument panel of this embodiment. This instrument panel is constructed by a base member 1 made of a resin material, a foamed body layer 2 laminated on a surface of the base member 1 and made of a polyurethan foamed body, and a skin 3 laminated on a surface of the foamed body layer 2.

A fragile portion 10 having an U-shape is formed on the base member 1 (a bottom part of it is shown in FIG. 1), and a hinge portion 11 generally thin but thicker than the fragile portion 10 is formed between opposed ends of the fragile portion 10. On a lower surface of the base member 1 a tubular air bag containing portion 12 is formed below the fragile portion 10 to contain an air bag 4 therein.

The skin 3 is constructed by a general portion 30 forming most of the instrument panel, and a door portion 31 having a circular or rectangular shape and positioned to face with the air bag containing portion 12, and an annular endless groove portion 32 is formed at a boundary area between the general portion 30 and the door portion 31. The general portion 30 and the door portion 31 are separately formed, and therefore the groove portion 32 has at a bottom portion thereof a parting line where the general portion 30 and the door portion 31 are to be parted or separated. Along an end portion of the general portion 30 facing with the groove portion 32 an annular first bent portion 33 is formed to bend toward a rear surface of the general portion 30 by an obtuse angle relative to a front surface thereof. Along an end portion of the door portion 31 facing with the groove portion 32 an annular second bent portion 34 is formed to bend toward a rear surface of the door portion 31 by an acute angle relative to a front surface thereof. The first bent portion 33 and the second bent portion 34 are closely contacted to each other at opposing surfaces, and a urethan slub tape 6 covering a tip end of them is adhered thereto.

This instrument panel has been produced in the following steps. Firstly, the base portion 1 is formed by an injection-molding. The fragile portion 10, the hinge portion 11 and the air bag containing portion 12 are formed simultaneous with forming of the base member 1.

Figure 2:
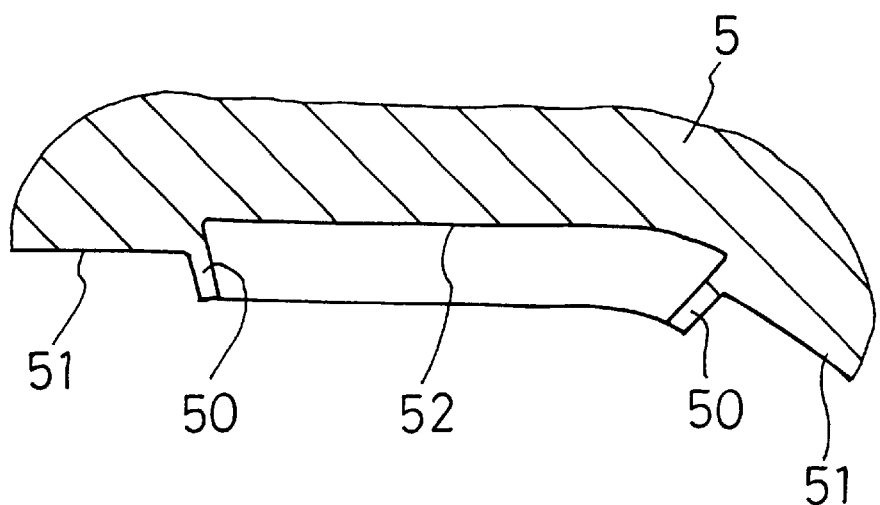
FIG. 2 is a partial cross-sectional view showing a powder slush mold used in the first embodiment of the present invention.

FIG. 2 is a partial and enlarged cross sectional view showing a molding surface of a powder slush-mold 5 used to produce the skin 3. On a molding surface of the power slush mold 5, an annular wall 50 is formed to define an enclosing and protruded surface 51 and an enclosed and recessed surface 52 recessed in a thickness direction of the mold 5. The wall 50 has a substantially truncated square pyramid shape the diameter of which gradually decreases toward a tip end thereof, and is wholly inclined inwardly by 70 degrees relative to the recessed surface 52. The wall 50 has a thickness of about 1 mm, and the protruded surface 51 and the recessed surface 52 forms a step of about 2.9 mm height.

As thickness of the wall 50 decreases the step height between the protruded surface 51 and the recessed surface 52 decreases, which is convenient to reduce wasteful or useless amount of the skin 3 formed by the mold 5. It is noted however, the wall 50 needs to have thickness more than 1 mm to secure desired strength of the mold 5.

Figure 3:
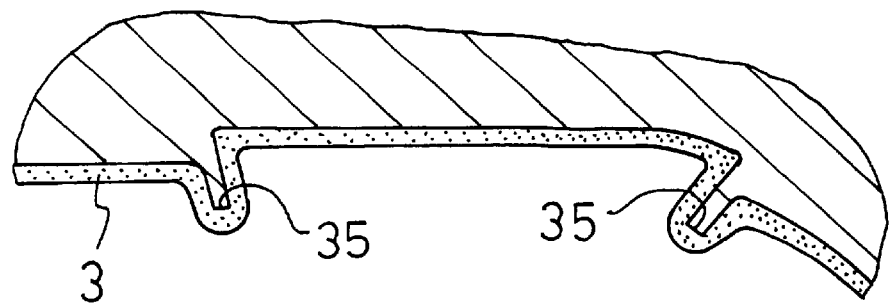
FIG. 3 is a partial cross-sectional view showing the powder slush mold on which a skin is formed in the first embodiment of the present invention.

The skin 3 is powder-slush-formed of a thermoplastic polyurethan powder by utilizing the powder slush mold 5. The skin 3 is formed, as shown in FIG. 3, to cover the wall 50, the protruded surface 51 and the recessed surface 52 of the mold 5. On the skin 3, at position corresponding to the wall 50 of the mold 5, an annular groove portion 35 having substantially U-shape cross-section is formed.

Figure 4:
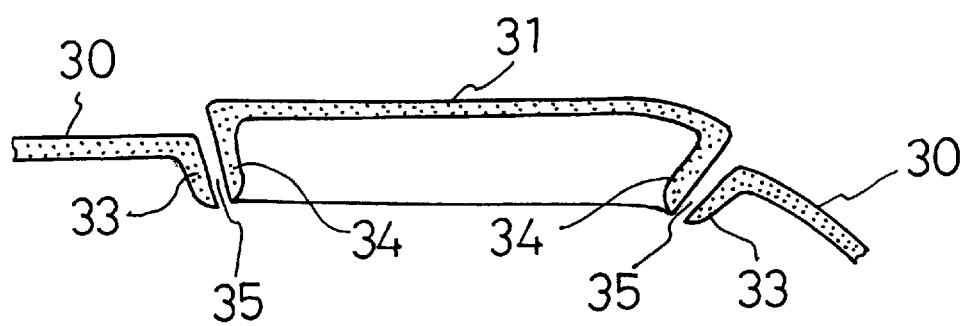
FIG. 4 is a partial cross-sectional view showing the skin in a cut state in the first embodiment of the present invention.

Next, the skin 3 is demolded from the powder slush mold 5, and the groove portion 35 is cut at the bottom portion thereof. As shown in FIG. 4, cutting the groove portion 35 separates the skin 3 into the door portion 31 and the general portion 30. At the end portion of the general portion 30 facing with the door portion 31, the annular first bent portion 33 bent toward the rear surface by the obtuse angle relative to the surface of the general portion 30 is formed, while at the end portion of the door portion 31 facing with the first bent portion 33 the annular second bent portion 34 bent toward the rear surface by the acute angle relative to the surface of the door portion 31 is formed.

In the skin 3 thus produced, the door portion 31 and the general portion 30 are relatively shifted so that the surface of the former and the surface of the latter are flush with each other. Here, the first bent portion 33 and the second bent portion 34 gradually come close to each other during the relative shift due to their inclinations, and are brought into abutment at the time when the surface of the door portion 31 and the surface of the general portion 30 are flush with each other. To a tip of the first bent portion 33 and the second bent portion 34, the urethan slub tape 6 is adhered to seal them.

Figure 5:
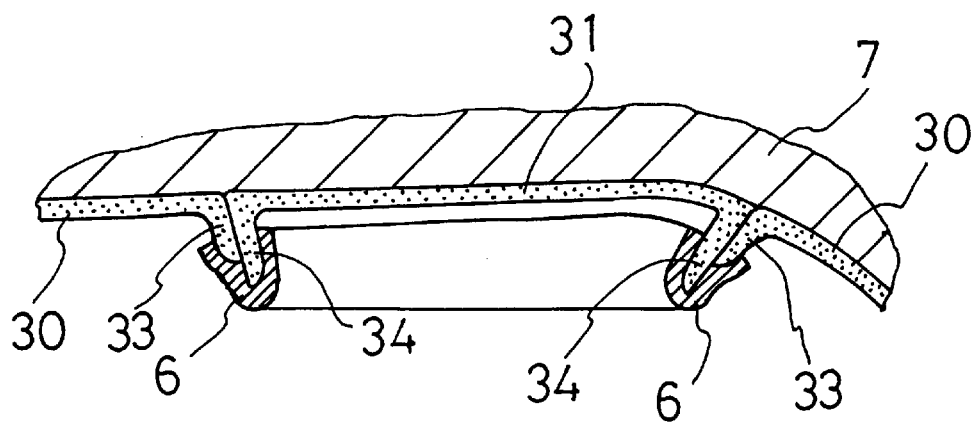
FIG. 5 is an explanatory cross-sectional view showing a state where the skin is disposed on a molding surface of a foam mold in the first embodiment of the present invention.

Thereafter, as shown in FIG. 5, the skin 3 is subject to a vacuum absorbing to be absorbed and held on one molding surface of a foam mold 7. Here, the first bent portion 33 and the second bent portion 34 are closely contacted to each other, so that the groove 32 formed therebetween extends lineally and having an extremely small width. The urethan slub tape 6 seals this linear groove 32.

In this condition, the base member 1 formed in advance is disposed on other molding surface (not shown) of the foam mold 7, and a foaming urethan resin is poured into a space formed between the skin 3 and the base member 1. Thus, the foamed body layer 2 joined with the base member 1 and the skin 3 integrally is formed. Here, the poured-in foaming urethan resin will not leak through the groove portion 32 since the first bent portion 33 and the second bent portion 34 are closely contacted to each other and is covered by the urethan slub tape 6.

In the thus produced instrument panel, on a design surface of the skin 3, the surface of the general portion 30 and the surface of the door portion 31 flush with each other appear, and there is almost no fear of resin leakage due to extremely small width of the groove portion 32. In addition, the first bent portion 33 and the second bent portion 34 are closely contacted to each other in the separated condition, so any stress resulted from deformation of them will not occur in the first and second bent portions 33 and 34, whereby deformation of the skin 3 by the stress can be prevented. For this reason, the skin 3 is excellent in surface appearance and has smooth feeling. Further, even when the first bent portion 33 and the second bent portion 34 are opened or spaced at the groove portion 32 in an endurance test etc., only the surface of the first bent portion 33 inclined by obtuse angle is exposed but a deeper part of the groove portion 32 inclined by acute angle is not exposed, so that the surface appearance is not deteriorated.

In FIG. 1, when the air bag 4 contained in the air bag containing portion 12 of the base member 1 expands by shock applied to the automobile, the base member 1 is torn along the fragile portion 10 and is rocked toward the foamed body layer 2 about the hinge portion 11 by the expanding force of the air bag 4. The rocking force of the foamed body layer 2 transmitted from the 3 base member 1 tears and opens the foamed body layer 2 along a line corresponding to by the fragile portion 10. By the tearing force from the foamed body layer 2, the skin 3 is going to be torn at the groove portion 32.

Here, the foaming urethan resin is impregnated into the urethan slub tape 6 and is solidified therein to make the urethan slub tape 6 extremely fragile. In addition, the first bent portion 33 and the second bent portion 34 are merely closely contacted. Accordingly, the skin 3 can be easily parted into the first and second bent portions 33 and 34 at the groove portion 32. In this way, the instrument panel comprised of the base member 1, the foamed body layer 2 and the skin 3 is torn and opened along the U-shape line to open the door portion 31 and the part of the base member 1 enclosed by the fragile portion 10 about the hinge portion 11, thereby allowing the air bag 4 to develop into the vehicle room.

In addition, the first bent portion 33 and the second bent portion 34 of the skin 3 are inclined inwardly relative to the door portion 31 (toward a central portion of the door portion 31) by the angle of 70 degree, so that the diameter or distance between the first and second bent portions 33 and 34 increases toward the outside (upper surface in FIG. 1). Accordingly, the first and second bent portions 33 and 34 can guide the expanding air bag 4 and will not scatter chip of the skin 3 due to non-interference relation therebetween.

Here, in the instrument panel of this embodiment, the general portion 30 and the door portion 31 of the skin 3 can be formed by the separate or independent members. Here, the general portion 30 needs to be provided with a hole portion having size corresponding to the door portion 31.

In this case, the instrument panel can be produced by the same process as the above instrument panel, except that cutting of the groove 35 of the skin 3 can be omitted by forming the first bent portion 33 and the second bent portion 34 on the general portion 30 and the door portion 31 in advance. The general portion 30 and the door portion 31 are preferably produced by the same or common mold, but can be produced by the different or respective molds.

<Embodiment 2>

In the above embodiment 1, thickness of the wall 50 of the powder slush mold 5 can hardly be thinned smaller 1 mm, and therefore width of the groove portion 35 of the skin 3 can hardly be narrowed furthermore. However, according to the following process for the air bag door part, even when the wall 50 of the mold 5 has the thickness larger than 1 mm, the general portion 30 and the door portion 31 of the skin 3 can be flush with each other, although some skin 3 is wastefully used.

Figure 6:
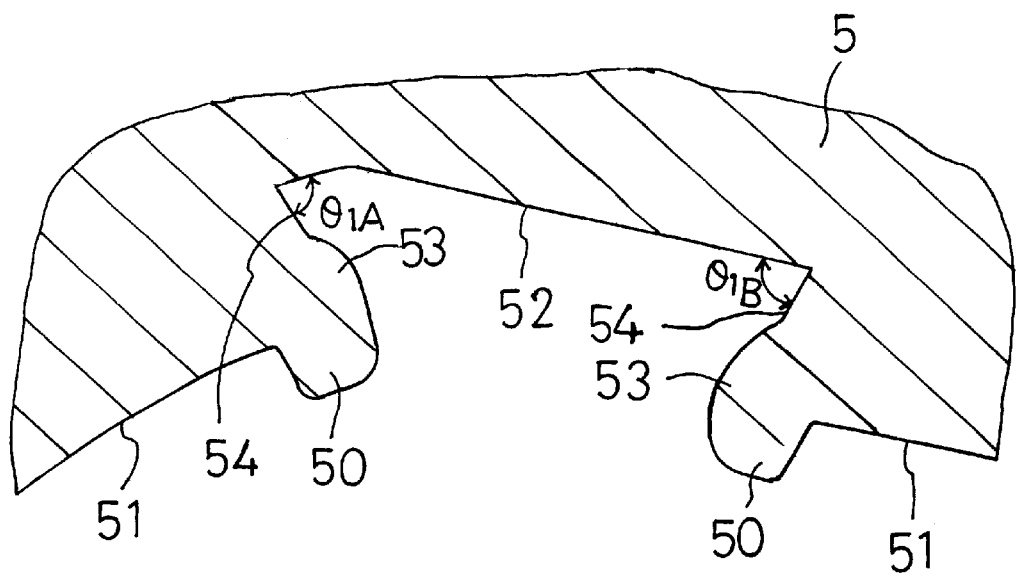
FIG. 6 is a partial cross-sectional view showing a powder slush mold used in the second embodiment of the present invention.

That is, the embodiment 2 uses a powder slush mold 5 shown in FIG. 6 for forming the skin 3. On a molding surface of the powder slush mold 5, an annular wall 50 is formed to define at a part of the molding surface enclosed by the wall 50, and a recessed molding surface 52 (molding surface H) recessed relative the protruded surface 51 (molding surface L) is formed. The wall 50 is inclined inwardly by an acute angle relative to the recessed molding surface 52 (molding surface H), and wholly has a substantially truncated square pyramid shape in which diameter of the wall 50 decreases toward a tip end thereof. At the tip end of the wall 50 a ring-like protruded portion 53 protruded radially inwardly is formed along a periphery of the recessed molding surface 52 (molding surface H), while at a root portion of the wall 50 an annular recessed portion 54 recessed radially outwardly is formed along the periphery of the recessed molding surface 52. Such construction of the mold 5 can not only shorten distance between the inner peripheral surface of the recessed portion 54 and the outer peripheral surface of the wall 50, but can give the wall 50 a substantial thickness thereof to have the sufficient strength.

Here, the angles determined by the both inner peripheral surfaces of the recessed portion 54 and the recessed molding surface 52 (molding surface H) are named $\theta_{1A}$ and $\theta_{1B}$ respectively. In this embodiment, the both angles $\theta_{1A}$ and $\theta_{1B}$ are selected to be 75 degrees approximately. When the both angles $\theta_{1A}$ and $\theta_{1B}$ are smaller than 65 degrees, angle difference between the inclined angle (obtuse angle) of the wall 50 at side of the enclosing molding surface 51 (molding surface L) and the inclined angle (acute angle) of the wall 50 at side of the recessed molding 52 surface (molding surface H) increases. As a result, the difference of radius of the round portion of the skin 3 formed by the corner portions of the mold 5 between the inside and outside of the wall 50 increases, so that surface appearance of the skin is deteriorated. For this reason, the angles $\theta_{1A}$ and $\theta_{1B}$ are preferably selected to be larger than 65 degrees, but smaller than 85 degrees.

Figure 7:
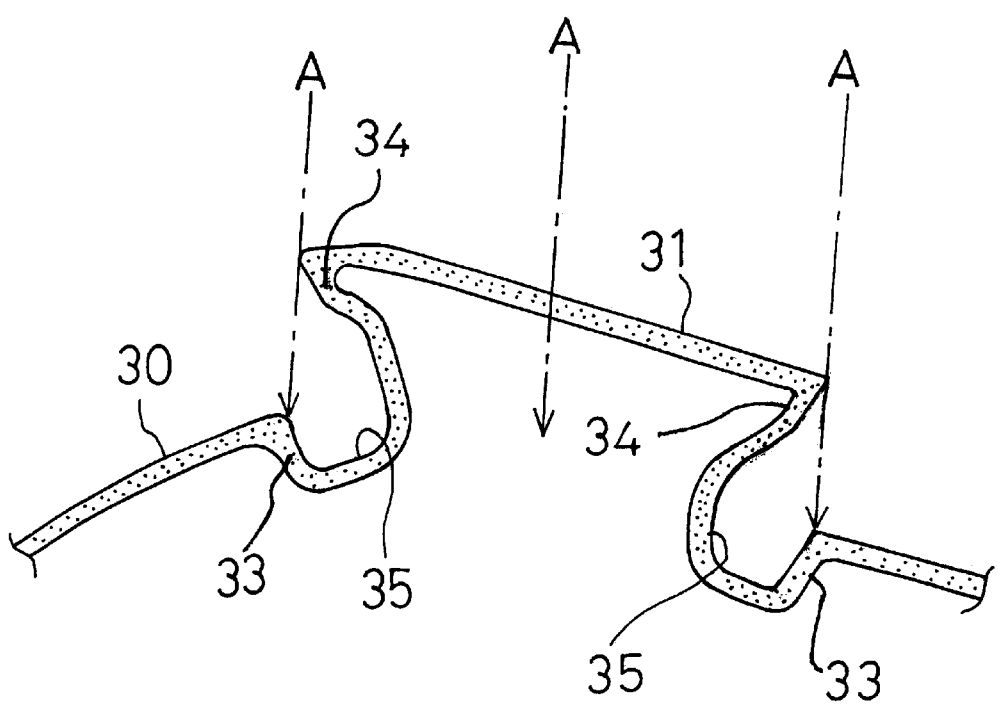
FIG. 7 is a partial cross-sectional view showing a skin produced by the second embodiment of the present invention.

The skin 3 produced by this powder slush mold 5 is, as shown in FIG. 7, provided with an annular groove portion 35 having a substantially U-shape cross section at position corresponding to the wall 50 of the mold 5. Cutting the groove portion 35 at a bottom portion thereof can separate the skin 3 into the general portion 30 and the door portion 31 of which surfaces can be flush with each other by relatively shifting the body portion 30 and the door portion 31 in the direction shown by an arrow A.

In the air bag door part of this embodiment, width of the groove portion 35 to be formed between the general portion 30 and the door portion 31 when the surfaces of them are flush can be extremely narrowed, with maintaining strength of the wall 50.

In addition, since the wall 50 of the mold 5 are inclined inwardly by the angles of $\theta_{1A}$ and $\theta_{1B}$ at the root portion thereof, the first bent portion 33 and the second bent portion 34 of the skin 3 formed by the mold 5 are inclined inwardly by approximately 75 degrees relative to the surface of the door portion 31. For this inclination, diameter or distance between the first and second bent portions 34 and 35 increases toward the front (upper) surface of the door portion 31. Therefore, in the air bag door construction produced by this skin 3, the air bag can expand smoothly in the development thereof, and will not scatter chip of the skin 3 due to non-interference relation between the first and second bent portions 33 and 34.

What is claim is:

1. A method for manufacturing an air bag door skin, comprising:
   preparing a mold including a general molding surface and a door molding surface separated by an endless and annular wall, there being a height difference between said general molding surface and said door molding surface;
   forming a skin on said mold including an annular groove portion of a substantially U-shaped cross-section formed on said endless and annular wall of said mold, a general portion formed on said general molding surface located outside the groove portion, and a door portion formed on said door molding surface enclosed by said annular groove portion, and having a height difference between a surface of said general portion and a surface of said door portion said annular groove portion having a step between said general portion and said door portion;
   separating said skin from said mold; and
   separating said general portion and said door portion by cutting a bottom portion of said annular groove portion followed by a step of removing said height difference between said general portion and said door portion by relatively shifting said general portion and said door portion thus eliminating said step of said groove portion between said general portion and said door portion.

2. A method for manufacturing an air bag door skin according to claim 1, wherein said door molding surface of said mold is at a higher position than said general molding surface.

3. A method for manufacturing an air bag door skin according to claim 1, wherein said endless and annular wall of said mold is formed at a predetermined angle relative to said door molding surface of said mold.

4. A method for manufacturing an air bag door skin according to claim 3, wherein said predetermined angle is acute.

5. A method for manufacturing an air bag door skin according to claim 1, wherein said endless and annular wall of said mold includes protrusions on either side of said endless and annular wall.

6. A method for manufacturing an air bag door skin according to claim 5, wherein said endless and annular wall of said mold is formed at a predetermined angle relative to said door molding surface of said mold.

7. A method for manufacturing an air bag door skin according to claim 6, wherein said predetermined angle is acute.

8. A method for manufacturing a skin having a general portion and a defined portion defined by an annular groove formed at a part of the general portion, comprising:
   preparing a mold with a mold surface having an endless and annular wall protruding from said molding surface, wherein said endless and annular wall of the mold separates a general molding surface of said molding surface from a defined molding surface of said molding surface and is formed at a predetermined angle relative to said general molding surface and said defined molding surface;
   forming a coating on said molding surface including an annular groove portion of substantially U-shaped cross-section formed over said endless and annular wall of said molding surface, a general portion formed on said general molding surface of said molding surface located outside said endless and annular wall of said molding surface, and a defined portion formed on said defined molding surface of said molding surface enclosed by said endless and annular wall of said molding surface, and having a height difference between a surface of said general portion and a surface of said defined portion, said annular groove portion having a step between said general portion and said defined portion;
   separating said coating from said molding surface;
   separating said general portion and said defined portion by cutting a bottom portion of said annular groove portion followed by removing said height difference between said surface of said general portion and said surface of said defined portion by relatively shifting said general portion and said defined portion, thus eliminating said step in said annular groove portion between said general portion and said defined portion and thus forming said skin.

9. A method for manufacturing a skin having a general portion and a defined portion defined by an annular groove formed at a part of the general portion, comprising:

preparing a mold with a mold surface having an endless and annular wall protruding from said molding surface, wherein said endless and annular wall of the mold separates a general molding surface of said molding surface from a defined molding surface of said molding surface, and wherein said endless and annular wall of said mold surface includes protrusions on either side of said endless and annular wall;

forming a coating on said molding surface including an annular groove portion of substantially U-shaped cross-section formed over said endless and annular wall of said molding surface, a general portion formed on said general molding surface of said molding surface located outside said endless and annular wall of said molding surface, and a defined portion formed on said defined molding surface of said molding surface enclosed by said endless and annular wall of said molding surface, and having a height difference between a surface of said general portion and a surface of said defined portion, said annular groove portion having a step between said general portion and said defined portion;

separating said coating from said molding surface;

separating said general portion and said defined portion by cutting a bottom portion of said annular groove portion followed by removing said height difference between said surface of said general portion and said surface of said defined portion by relatively shifting said general portion and said defined portion, thus eliminating said step in said annular groove portion between said general portion and said defined portion and thus forming said skin.

10. A method for manufacturing a skin according to claim 9, wherein said endless and annular wall of said molding surface is formed at a predetermined angle relative to said general molding surface and said defined molding surface.

* * * * *